No. 727,566. PATENTED MAY 12, 1903.
V. G. APPLE.
IGNITING SYSTEM.
APPLICATION FILED MAY 16, 1902.
NO MODEL. 2 SHEETS—SHEET 1.
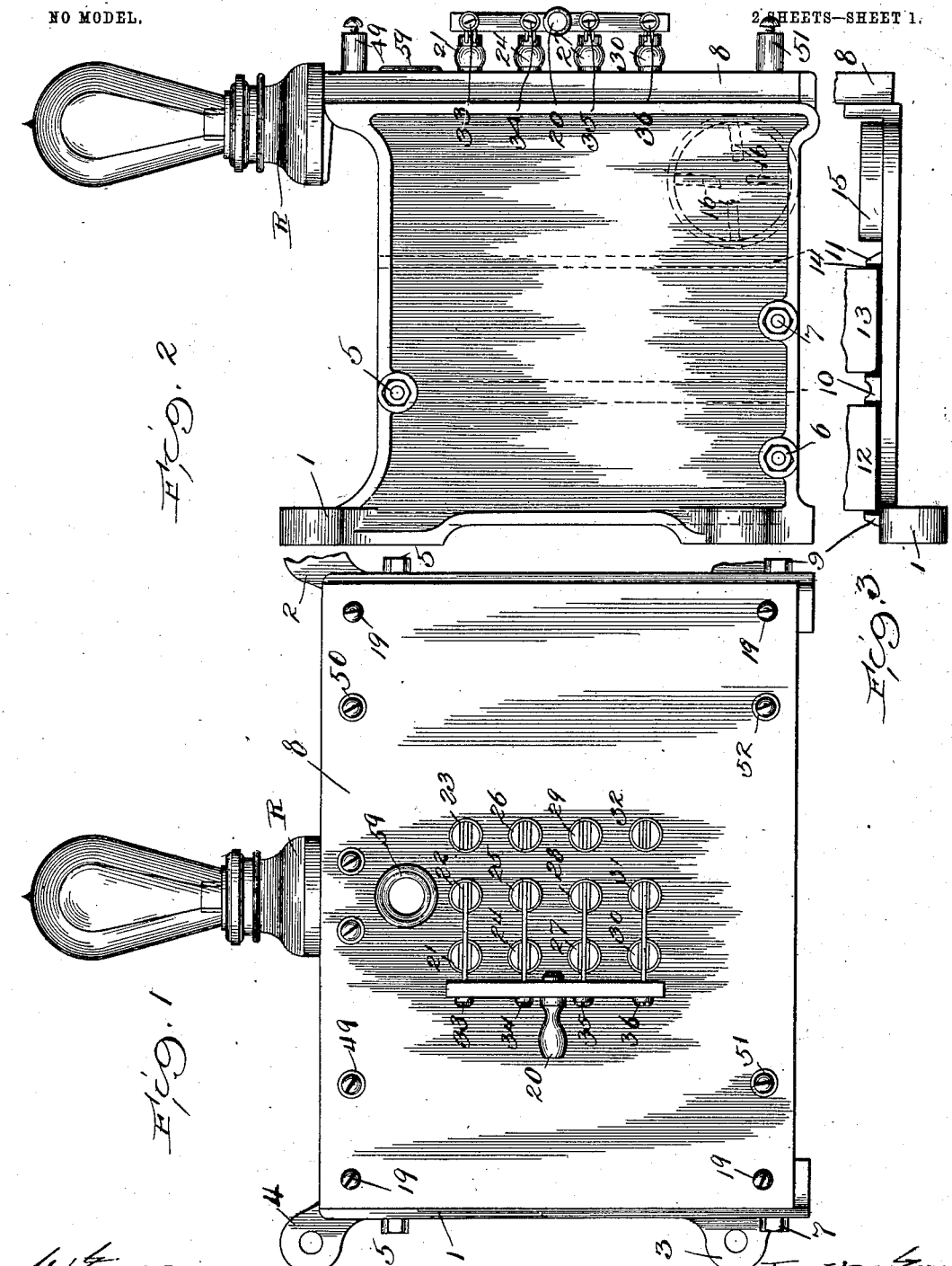

No. 727,566. PATENTED MAY 12, 1903.
V. G. APPLE.
IGNITING SYSTEM.
APPLICATION FILED MAY 16, 1902.
NO MODEL. 2 SHEETS—SHEET 2.
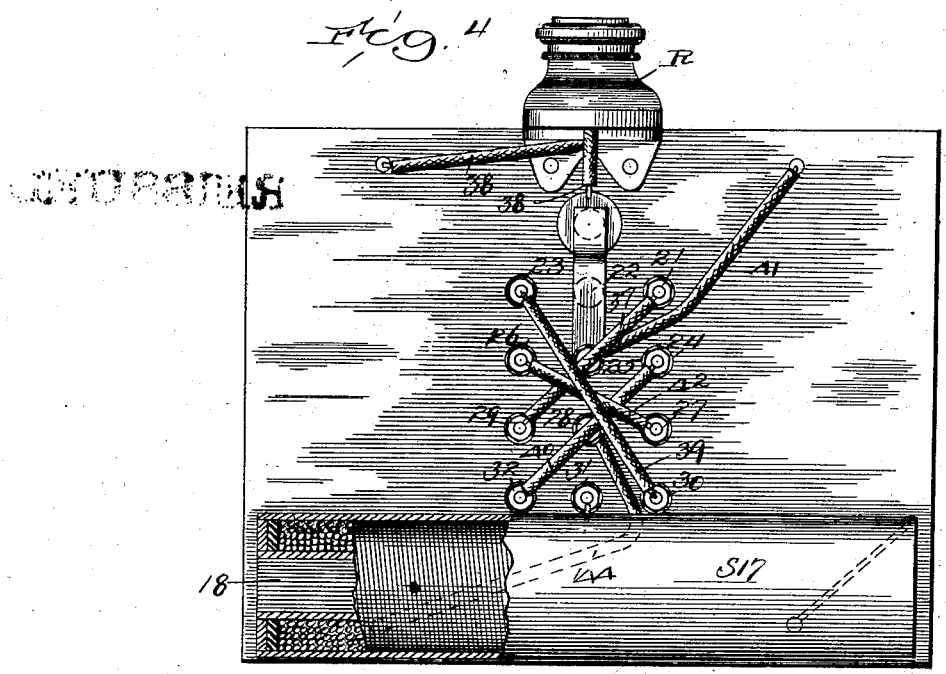
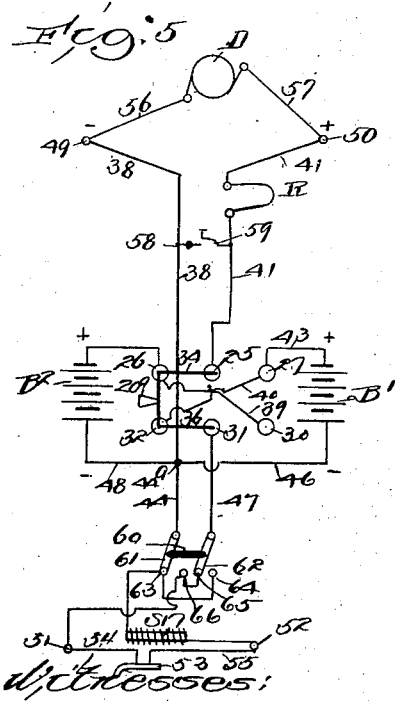
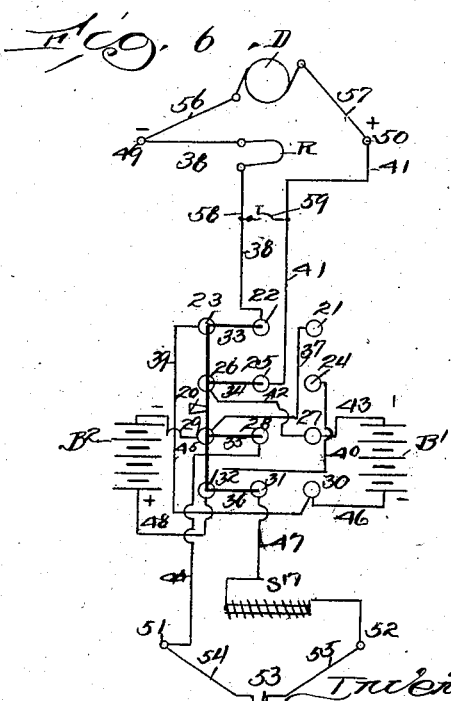
Witnesses:
Harry B. Lewhite.
Ray White
Inventor
Vincent G. Apple,
By Foree Bain Atty.

No. 727,566. Patented May 12, 1903.

UNITED STATES PATENT OFFICE.

VINCENT G. APPLE, OF DAYTON, OHIO.

IGNITING SYSTEM.

SPECIFICATION forming part of Letters Patent No. 727,566, dated May 12, 1903.

Application filed May 16, 1902. Serial No. 107,701. (No model)

*To all whom it may concern:*

Be it known that I, VINCENT G. APPLE, of Dayton, in the county of Montgomery and State of Ohio, have invented certain new and useful Improvements in Igniting Systems; and I hereby declare that the following is a full, clear, and exact description thereof, reference being had to the accompanying drawings, which form part of this specification.

My invention relates to improvements in igniting systems for igniting the fuel charge within the cylinders of gas-engines for producing the power impulses by the combustion of the inclosed fuel.

The object of my invention is to provide an electric system comprising the necessary electric circuits, a primary source of electric energy, two secondary sources of electric energy, preferably storage batteries, their peculiar relation and arrangement with reference to each other and with reference to the primary source of electric energy, and a means for changing the polarity relation of the sparking mechanism or circuit-interrupter with reference to the said source of electric energy.

My invention further consists in the features, circuits, and combinations of devices and parts, as hereinafter described, and more particularly pointed out in the appended claims.

In the drawings, Figure 1 is a front elevation of the frame upon which two storage batteries, a spark-coil, a resisting medium, and the switchboard of my device, by which my system are carried into effect, is mounted. Fig. 2 is a side elevation of the same. Fig. 3 is a broken-away portion showing a plan view of one end of the frame. Fig. 4 is a rear view of the switchboard. Fig. 5 is a diagram of circuits, showing the manner of operating the same with a double-pole double-throw switch and a circuit-polarity changer in connection therewith. Fig. 6 is a diagram of the circuits, showing a four-pole double-throw switch by virtue of which the direction of current from the respective secondary sources of current or storage batteries is changed with reference to the circuit-interrupter or sparking device inclosed within the cylinder of the gas-engine and by which the primary source of current is alternately connected with the respective batteries.

In all of the views the same reference letters and numerals indicate similar parts.

In the drawings, 1 and 2 are the housings or end parts of the frame by means of which the various devices are supported. 3 and 4 are lugs upon the respective frames, which are perforated for the reception of screws or bolts for attaching the same to an upright support. 5, 6, and 7 are tie-rods surrounded by the necessary separators for holding the said frame-pieces 1 and 2 in proper relation.

8 is an insulating-plate, of marble or like material, upon which the various electric terminals of the device are mounted.

The frame-plates 1 and 2 are provided on their inside confronting surfaces with ribs 9, 10, and 11, between which storage batteries 12 and 13 are adapted to be contained. The channels formed between the ribs are lined with an insulating material 14, by means of which the storage batteries are insulated from the metal part of the device. Each frame is provided with a circular rim 15, having four internal radial ribs 16, by means of which the sparking coil $S^{17}$ is held in position. The core 18 of the sparking coil is adapted to enter the space left between the radial ribs 16, which centralize the coil and which is surrounded on its outside by means of the circular rim 15. The plate 8 is fixed to the frames 1 and 2 by the screws 19 19.

Figs. 1, 2, and 3 show a four-pole double-throw electric switch. I have numbered the terminals of the four-pole double-throw switch from 21 to 32, inclusive. The switch I have designated 20. The four insulated blades 33, 34, 35, and 36 are pivoted, respectively, to the terminals 22, 25, 28, and 31. When the switch is thrown in the opposite direction to that shown in Fig. 1, these blades are adapted to engage the terminals 23, 26, 29, and 32, respectively. Referring to Figs. 4, 5, and 6, terminal 21 is connected to terminal 29 by the wire 37, terminal 22 is connected to the dynamo through a suitable resistance R by wire 38, terminal 23 is connected to terminal 30 by wire 39, terminal 24 is connected to terminal 32 by wire 40, terminal 25 is connected to the positive side of the dynamo by wire 41, terminal 26 is connected to terminal 27 by wire 42, terminal 27 is connected to the positive end of the battery B' by wire 43, terminal 28 is connected to the circuit-interrupter or sparking device by wire 44, terminal 29 is connected to the negative side of the battery B² by wire 45, terminal 30 is connected to the negative side of the battery B' by wire 46, terminal 31 is connected to the spark-coil S¹⁷ by the wire 47, and terminal 32 is connected to the positive side of the battery B² by the wire 48.

49 and 50 are the dynamo-terminals, and 51 and 52 are the sparking-device terminals.

53 is a sparking device adapted to be contained within the cylinder of a gas-engine. It is connected to the switchboard-terminals 51 and 52 by means of the wires 54 and 55.

R is a resistance, such as an incandescent lamp, adapted to be contained in the circuit between the terminal 22 and the negative binding-post of the dynamo, or it may be contained in series circuit with the dynamo at any point in that circuit. When a special dynamo adapted to provide the required voltage is employed, the resistance R may be eliminated, and a fuse or other suitable connection substituted therefor. Fuse-plugs may be made to screw into the lamp-socket on the casing to be interchangeable with the lamps for such purpose.

D is a dynamo or other primary source of current, the positive terminal of which is connected to the switchboard-terminal 50 by the wire 57.

58 is a polarity-indicator for showing the direction of current coming from the dynamo. It is placed in circuit across the terminals of the dynamo and adapted to be temporarily closed by a switch 59, shown in the front of the switchboard of Fig. 1 as a push-button.

The circuits shown in Diagram 6 are as follows: The four-pole double-throw switch is thrown so that its blades 33, 34, 35, and 36 make contact with the terminal studs 23, 26, 29, and 32, respectively. In this position the current leaving the positive post of a dynamo will pass over wire 41 to the terminal 25, through the blade 34 to the terminal 26, over the wire 42, and will enter battery B' by the wire 43 at the positive terminal and charge the battery, the circuit returning by the way of wire 46 and wire 39 to the switch-terminal 23, through the switch-blade 33 to the terminal 22, over the wire 38, through the resistance R to the negative terminal of the switchboard 49, through the wire 56 to the negative terminal of the dynamo, thus charging battery B'. At the same time the current will pass from the positive side of battery B², over wire 48 to terminal 32, over switch-blade 36 to the terminal 31, over wire 47 to the spark-coil S¹⁷ to the terminal of the switchboard 52, and from thence over the wire 55 to the circuit-interrupter or sparking device 53, returning over the wire 54 to the switchboard-terminal 51, from thence to the switch-terminal 28, over the wire 44, through the switch-blade 35 to the terminal 29, from thence to the negative terminal of battery B² over the wire 45. The sparking device in this instance will be operated by the storage battery B² while the storage battery B' is being charged by the dynamo.

From the circuit just described it will be noticed that the direct current enters the sparking device from the terminal 52. If now the switch 20 be reversed, so that its respective blades make contact with the terminals 21, 24, 27, and 30, then the dynamo will have been switched to battery B², and this battery will be charged thereby, while battery B' will send current through the sparking device; but the direction of current in this case will be reversed, so that the current will enter the sparking device over the wire 54 from the switchboard-terminal.

It is a well-known fact that the positive terminal of an electric arc becomes very much hotter than the negative terminal of the said arc and that combustion of the positive terminal is more rapidly promoted by the intense heat of that terminal. It has been noticed that the contacts in circuit-interrupters located within the cylinders of gas-engines suffer from this effect. My system has been arranged and the apparatus so constructed that the current from the respective batteries B' and B² shall always enter the sparking device from opposite terminals, so that in one case a given contact of the sparking device will be of positive polarity, while in the case with reference to the next battery the same contacts will be of negative polarity, and in this way the wear or disintegration of the respective contacts are equalized. My system provides one battery which is at all times being charged by the dynamo, while the other battery is affording current for the sparking device, and while the second-named battery is being charged the first-named battery may be furnishing current for the sparking device. In this manner the batteries may be charged during alternate days or other convenient periods of time, so as to retain them completely charged, and thereby maintain them in the best working order, and the destructive effects of the contacts of the sparking device are equalized. This is all accomplished in the manner which I have just described by means of the four-pole double-throw switch. In Diagram 5 there is illustrated a means by which the same objects may be accomplished with a double-pole double-throw switch by aid of a circuit-polarity changer. The parts and circuits are indicated to conform as near as possible to Diagram 6. When the switch 20ª is thrown to the left, as shown, the circuit from the positive side of the dynamo passes through battery B² and the circuit from battery B' passes into the circuit containing the circuit-interrupter, and when the switch 20ª is thrown to the right the circuit from the dynamo will pass into the battery B', and a current from the battery B² will pass over the circuit containing the circuit-interrupter in the same direction in a manner which will be plainly understood from the diagram in view of the explanation of diagram Fig. 6. For the purpose of reversing the direction of the current through the circuit containing the circuit-interrupter I have included in the circuit a polarity-changing switch 60, having blades 61 and 62 and contacts 63, 64, 65, and 66. In the position of the switch as shown in the diagram the circuit from the positive side of the battery B' will pass from the terminal 27 over the wire 40 to the terminals 32, through the switch-blade 36 to the wire 47, to the blade 62, to the terminal 51 on the switchboard. From thence it will pass through the circuit-interrupter to the terminal 52 on the switchboard, thence through the spark-coil $S^{17}$ to the terminal 63, over the blade 61 through the wire 44 to the contact-point $44^a$, where it will return to the battery B' over the wire 46. Now when the switch $20^a$ is turned to the right the current from the battery B² will enter the circuit-interrupter exactly in the same direction unless the polarity-changing switch 60 is turned so that the blades 61 and 62 will make connection with the contacts 64 and 66. In this event the circuit through the circuit-interrupter will be changed, so that the direction of current will be reversed and will flow through the interrupter exactly in the same manner as it was shown when the circuit was reversed in Diagram 6. The system shown in Fig. 5 may be used without the polarity-changing switch 60, so that the circuit will always pass through the circuit-interrupter in a given direction, if desired; but the full benefit of my system will not be realized when this method is adopted.

I have shown a polarity-indicator 58 connected between the wires 38 and 41 for the purpose of showing the direction of current produced by the dynamo, so that when the dynamo is connected to the switchboard it may be quickly ascertained whether the polarity of the dynamo is properly arranged with reference to the polarity of the respective batteries.

The frame upon which the batteries, the spark-coil, the resistance device, and the switchboard are arranged is a very convenient form and provides a construction in which all of the devices are self-contained and leaving a minimum number of connections to be made—that is to say, only the terminals 49 and 50, which are designed to be connected to the dynamo or other primary source of current, and the terminals 51 and 52, which are designed to be connected to the circuit-interrupter located in the engine-cylinder. The connections to the other devices are self-contained and arranged as shown in the diagrams and in the various drawings.

It is of course understood that when the switch 20 occupies a position midway between the terminals on either side thereof that all the circuits in the system are open.

The same beneficial results follow the use of my system with regard to the circuit-interrupter of the primary circuit when an induction transformer-coil is used and when the jump-spark produced thereby is substituted in the engine-cylinder for the "touch" sparking device. My invention contemplates the use of such a device. It has been described in connection with an interrupter placed within the cylinder of the engine for the sake of clearness. The substitution of the jump-spark terminals within the engine and the circuit-interrupter adapted to vibrate the current flowing in the primary circuit of the induction-coil is within the common knowledge of those persons who are skilled in the art.

Having described my invention, what I claim as new and useful, and desire to secure by Letters Patent of the United States, is—

1. In an ignition system for gas-engines, a primary source of current, two secondary sources of current, a circuit adapted to connect said primary source of current with either of the secondary sources of current, a circuit-interrupter, a circuit adapted to connect said circuit-interrupter with either secondary source of current, and a switch adapted to simultaneously connect said interrupter with one secondary source of current, and the primary source of current with the other secondary source of current, and to reverse the polarity of the current in the circuit containing the circuit-interrupter.

2. In an ignition system for gas-engines, the combination with a primary source of electric current and a current-interrupter adapted for connection with an engine, of two secondary sources of current, a circuit adapted to connect the primary source of current with either of said secondary sources of current, a circuit adapted to connect the circuit-interrupter with either secondary source of current-supply, and a double-throw switch common to both circuits, adapted when in one position to connect one of said secondary sources of current-supply in the circuit containing the primary source of current-supply and simultaneously connect the other secondary source of supply in the circuit containing the current-interrupter, and when moved to the other position to reverse such connections, said switch being arranged to reverse the polarity of the current in the circuit containing the current-interrupter whenever moved to reverse the connections of the secondary source of supply as aforesaid.

3. In an ignition system for gas-engines, the combination with a primary source of current, and a gas-engine igniter, of two secondary batteries, a four-pole double-throw switch, a circuit connecting the primary source of current with two switch-blades, a circuit connecting the igniter with the other two switch-blades, and circuits connecting each of said batteries with two pairs of switch-terminals adapted to receive respectively the igniter-circuit blades and the blades connected with the primary source of supply, opposite poles of said batteries being connected to corresponding terminals arranged to receive the blades connected with the igniter-circuit, whereby the movement of the blades simultaneously reverses the respective connections of the secondary batteries with the primary source of current and the igniter, and reverses the polarity of the current in the igniter-circuit.

4. In a self-contained ignition outfit, a structure comprising two side frames, and a connecting-switchboard, of a spark-coil and two batteries mounted in the frame, a four-pole, double-throw switch on the switchboard, having blade-posts 22, 25, 28, and 21, and terminals 21, 23, 24, 26, 27, 29, 30 and 32; circuit-terminals 49 and 50 on the board adapted for connection with a primary source of current-supply, and terminals 51 and 52 adapted for connection with a gas-engine igniter, and permanent, established connections arranged upon the rear of the board, connecting terminal 52 with the blade-post 31 through the spark-coil; the terminal 51 with the post 28; the terminals 49 and 50 with the posts 22 and 25, the positive pole of one battery with terminals 32 and 24, the negative pole of said battery with terminals 29 and 21; the positive pole of the other battery with terminals 27 and 26 and the negative pole of said battery with terminals 30 and 23, substantially as described.

In testimony that I claim the foregoing as my own I affix my signature in presence of two witnesses.

VINCENT G. APPLE.

In presence of—
L. M. ARNOLD,
B. P. WOLF.